(12) United States Patent
Xiao et al.

(10) Patent No.: US 11,674,021 B2
(45) Date of Patent: Jun. 13, 2023

(54) FLAME RETARDANT COMPOSITION

(71) Applicant: Nano and Advanced Materials Institute Limited, Hong Kong (CN)

(72) Inventors: Bin Xiao, Hong Kong (CN); Christopher Cheung Yee, Hong Kong (CN); Han Wang, Hong Kong (CN); Jianzhuo Xin, Hong Kong (CN); Jifan Li, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 451 days.

(21) Appl. No.: 15/929,885

(22) Filed: May 28, 2020

(65) Prior Publication Data

US 2020/0377704 A1     Dec. 3, 2020

Related U.S. Application Data

(60) Provisional application No. 62/921,013, filed on May 28, 2019.

(51) Int. Cl.
| | | |
|---|---|---|
| *C08L 19/00* | (2006.01) | |
| *C08L 23/08* | (2006.01) | |
| *C08L 75/04* | (2006.01) | |
| *C08K 3/22* | (2006.01) | |
| *C08K 3/26* | (2006.01) | |

(52) U.S. Cl.
CPC ........... *C08L 19/00* (2013.01); *C08L 23/0853* (2013.01); *C08L 75/04* (2013.01); *C08K 3/26* (2013.01); *C08K 2003/2206* (2013.01); *C08K 2003/2227* (2013.01); *C08L 2201/02* (2013.01)

(58) Field of Classification Search
CPC ...... C08L 19/00; C08L 23/0853; C08L 75/04; C08L 2201/022; C08K 3/26; C08K 2003/2206; C08K 2003/2227
USPC .......................................................... 521/41
See application file for complete search history.

(56) References Cited

U.S. PATENT DOCUMENTS

| | | | | |
|---|---|---|---|---|
| 2003/0031818 A1* | 2/2003 | Horacek | .................. | C08K 3/38 |
| | | | | 428/36.9 |
| 2009/0215926 A1* | 8/2009 | Kozlowski | ........... | C08K 5/5205 |
| | | | | 523/179 |

FOREIGN PATENT DOCUMENTS

CN        104650441 A     5/2015

OTHER PUBLICATIONS

CN 104650441 A—machine translation (Year: 2015).*
Office Action of CN 202010482015.1 issued from the China National Intellectual Property Administration (CNIPA) dated Aug. 2, 2022.

* cited by examiner

*Primary Examiner* — Ling Siu Choi
*Assistant Examiner* — Ronald Grinsted
(74) *Attorney, Agent, or Firm* — S&F/WEHRW

(57) ABSTRACT

Flame retardant composition including: an optionally cross-linked rubber, an intumescent composition comprising a phosphate and a melamine polymer formed by combining melamine, formaldehyde, dicyandiamide, and aluminum hydroxide thereby forming the intumescent composition, a ceramic forming mixture, at least one glass additive, layered silicate nanoparticles, and optionally an antioxidant; and methods of preparation and use thereof.

18 Claims, 7 Drawing Sheets

| | Y1 | Y2 | Y3 | Y4 | Y5 | Y6 | Y7 | Y8 | Y9 | Y10 |
|---|---|---|---|---|---|---|---|---|---|---|
| EVA | 40 | 40 | 40 | 40 | 35 | 35 | 35 | 40 | 35 | 35 |
| Mica | 22 | 22 | 22 | 22 | 0 | 0 | 0 | 46.27 | 0 | 0 |
| ATH | 26.27 | 0 | 26.27 | 0 | 53.27 | 52.27 | 52.27 | 0 | 51 | 51 |
| Silica | 0 | 26.27 | 0 | 26.27 | 0 | 0 | 0 | 2 | 2.27 | 2.27 |
| Frit 1 | 4.4 | 4.4 | 0 | 0 | 0 | 0 | 4.4 | 4.4 | 4.4 | 0 |
| Frit 2 | 0 | 0 | 4.4 | 4.4 | 4.4 | 4.4 | 0 | 0 | 0 | 4.4 |
| 5001 | 1 | 1 | 1 | 1 | 1 | 1 | 1 | 1 | 1 | 1 |
| Zinc Stearate | 0.33 | 0.33 | 0.33 | 0.33 | 0.33 | 0.33 | 0.33 | 0.33 | 0.33 | 0.33 |
| Glass Fiber | 2 | 2 | 2 | 2 | 2 | 2 | 2 | 2 | 2 | 2 |
| 1010 | 1 | 1 | 1 | 1 | 1 | 1 | 1 | 1 | 1 | 1 |
| TAIC | 1 | 1 | 1 | 1 | 1 | 1 | 1 | 1 | 1 | 1 |
| 14-40 B | 1 | 1 | 1 | 1 | 1 | 1 | 1 | 1 | 1 | 1 |
| KH550 | 1 | 1 | 1 | 1 | 1 | 1 | 1 | 1 | 1 | 1 |
| MB50002 | 0 | 0 | 0 | 0 | 0 | 1 | 1 | 0 | 0 | 0 |

FIG. 3

Factors

| | 20 | 25 | 30 | 35 | 40 | 45 | 50 | 80 | 100 |
|---|---|---|---|---|---|---|---|---|---|
| Wollastonite(A) | | | | | | | | | |
| White Carbon Black (B) | 0 | 10 | | | | | | | |
| A172 (C) | 3 | 5 | 7 | 9 | | | | | |

If A > 40, then B = 0
Curing Agent: 0.8 phr 1440B
Curing Temperature: 180 °C
Curing Time: 8 minutes
Pressure: 2 MPa

Response

Average Tensile Strength at Break
Elongation at Break
Minimum Tensile Strength at Break
Maximum Tensile Strength at Break

Notes

Banbury Roller (78 mL), Base Weight: 40 g
Wollastonite size $D_{50}$ < 2500 mesh (5 micron)
Zinc Stearate none

FIG. 5

Master Table

| Sample Code | Factor 1<br>A. Wollastonite<br>phr | Factor 2<br>B. White Carbon Black<br>phr | Factor 3<br>CA172<br>phr | Response 1<br>Tensile Strength<br>MPa | Response 2<br>Elongation at Break<br>% | Response 3<br>Minimum Tensile Strength<br>MPa | Response 4<br>Maximum Tensile Strength<br>MPa |
|---|---|---|---|---|---|---|---|
| L1 | 50 | 0 | 9 | 8.77 | 262 | 6.33 | 7.32 |
| L2 | 25 | 10 | 7 | 7.18 | 402 | 6.94 | 7.41 |
| L3 | 20 | 0 | 3 | 7.38 | 615 | 7.51 | 8.52 |
| L4 | 80 | 0 | 3 | 7.87 | 196 | 7.6 | 8.19 |
| L5 | 40 | 10 | 9 | 5.97 | 241 | 5.62 | 6.36 |
| L6 | 35 | 0 | 9 | 7.05 | 470 | 6.91 | 7.2 |
| L7 | 20 | 0 | 3 | 7.055 | 575 | 6.843 | 7.287 |
| L8 | 40 | 10 | 3 | 7.289 | 243 | 6.972 | 7.908 |
| L9 | 35 | 10 | 5 | 6.756 | 258 | 6.658 | 6.864 |
| L10 | 20 | 10 | 5 | 7.528 | 377 | 6.822 | 8.022 |
| L13 | 20 | 10 | 9 | 6.879 | 502 | 6.057 | 7.027 |
| L14 | 35 | 0 | 5 | 7.607 | 269 | 7.533 | 7.627 |
| L18 | 100 | 0 | 5 | 7.45 | 142 | 7.07 | 8 |
| L19 | 100 | 0 | 3 | 6.829 | 142 | 6.037 | 7.473 |
| L20 | 100 | 0 | 9 | 6.777 | 124 | 6.244 | 7.32 |
| L21 | 80 | 0 | 3 | 7.985 | 162 | 6.989 | 8.734 |
| L22 | 80 | 0 | 5 | 7.219 | 184 | 6.584 | 7.839 |
| L23 | 80 | 0 | 9 | 6.824 | 147 | 6.533 | 7.193 |

FIG. 6

| Constraints | | | | | | | |
|---|---|---|---|---|---|---|---|
| Lower | Upper | Lower | Upper | | | | |
| Name | Goal | Limit | Limit | Weight | Weight | Importance | |
| A:Wollastonite | is in range | 0 | 50 | 1 | 1 | 3 | |
| B:White Carbon Black | is equal to 0 | | 0 | 1 | 1 | 3 | |
| C:A172 | is in range | 3 | 3 | 1 | 1 | 3 | |
| Tensile Strength | maximize | 5.97 | 7.985 | 1 | 1 | 3 | |
| Elongation at Break | none | 125 | 400 | 1 | 1 | 3 | |
| Minimum Tensile Strength | none | 7 | 7.6 | 1 | 1 | 5 | |
| Maximum Tensile Strength | maximize | 7 | 8.734 | 1 | 1 | 3 | |

| Solutions | | | | | | | | |
|---|---|---|---|---|---|---|---|---|
| Number | Wollastonite | White Carbon Black | A172 | Tensile Strength | Elongation at Break | Minimum Tensile Strength | Maximum Tensile Strength | Desirability |
| 1 | 50 | 0 | 0 | 7.78611135 | 320.7758083 | 7.362866717 | 8.27820364 | 0.794867301 |
| 2 | 50.00011164 | 0 | 3.093802424 | 7.78144355 | 320.9881973 | 7.359769659 | 8.27257997 | 0.791191515 |
| 3 | 66.14799932 | 0 | 3.000013625 | 7.659908677 | 237.9167303 | 7.179143211 | 8.22378687 | 0.752785087 |

FIG. 7

FLAME RETARDANT COMPOSITION

CROSS-REFERENCE TO RELATED APPLICATIONS

This application claims the benefit of priority of U.S. Provisional Application No. 62/921,013, filed on May 28, 2019, the contents of which being hereby incorporated by reference in their entirety for all purposes.

TECHNICAL BACKGROUND

The present disclosure relates to a flame retardant composition, methods of preparation thereof, and articles comprising the same, such rods, beams, pipes, hoses, non-tubular profiles and panels.

BACKGROUND

Flame retardant materials can provide thermal protection up to about 1,000° C. Substrates (such as wood, various metals, such as copper, aluminum and steel etc., and various types of plastics, such as PVC, PET, and PA6) can be treated to make them flame retardant.

Conventional flame retardant compositions can include one or more halogen based flame retardant materials, such as brominated polystyrene or brominated phenylene oxide; phosphorus based materials based on materials, such as elemental phosphorus, phosphonate esters, phosphites, phosphates, and polyphosphates; nitrogen based materials, such as melamine and its salts; intumescent agents that can include an acid source (e.g., ammonium polyphosphate), a carbonization agent (e.g., polyhydric alcohols), and a blowing agent (e.g., melamine); and inorganic additives, such as magnesium hydroxide, aluminum hydroxide, and antimony trioxide.

In recent years, there has been considerable interest in the development of flame retardant compositions that do not utilize materials that present toxicological and/or environmental concerns, such as halogenated materials and heavy metals, such as antimony.

Other developmental research has focused on improving the fire retardant efficacy while maintaining weather durability of the flame retardant composition, and reducing the emission of smoke and volatile organic compounds (VOC). Preferably, the flame retardant compositions also exhibits the following properties: (1) reduction of available oxygen in confined areas, such as a room, to smother the fire and to retard the fire in the advent of a flashover; (2) providing a low rate of thermal transmission for coatings to protect various substrates, especially where low weight and low cost are critical, such as in aircraft and ships; (3) providing an effective intumescent fire-retardant coating for low density wood by-products, composite wood and plastic materials which require zero flame spread for prolonged time exposure during a fire; (4) sufficient mechanical properties and durability, to resist abrasion, impact and severe weather; and (5) non-toxic before it is exposed to heat. The combustion products of the flame retardant composite material to heat should also be below the gas level emissions required by today's transportation standards.

Also, in many cases, applying flame retardant composite material to substrates, such as wood, PVC, thermoplastics, aluminum and epoxies is impractical for reasons other than fire protection, as they lack the necessary abrasion resistance, impact resistance, water resistance, and resistance to other environmental factors for the specified application.

Due to the above factors, present flame retardant compositions may not provide adequate protection from fire and heat for sufficient time duration during a fire and are not durable enough to make them cost effective.

Accordingly, there is a need for new and improved flame retardant compositions that address or overcome at least some of the aforementioned needs. Preferably, the flame retardant composition should be capable of being applied to a variety of substrates, such as iron, steel, stainless steel, aluminum, and other non-ferrous metals, wood, plywood, particle board, and other wood by-products, plastics, PVC, thermoplastics, epoxies, and composites.

SUMMARY

It is an object of the present disclosure to overcome at least some of the drawbacks of conventional flame retardant compositions by providing an improved flame retardant composition and a process for its production.

Advantaegously, the flame retardant compositions provided herein can form a soft, flexible and thick layer at room temperature, but will converted to a hard and porous ceramic structure for thermal insulation and fire-proof after heating. The flame retardant compositions can withstand high temperatures of 1000° C. or higher for extended periods of time and also provide sufficient mechanical strength and electrical insulation effect.

In a first aspect, provided herein is a flame retardant composition comprising: 30-50% by weight of a rubber; 5-10% by weight of an intumescent composition comprising a phosphate and a melamine polymer formed by combining melamine, formaldehyde, dicyandiamide, and aluminum hydroxide thereby forming the intumescent composition; 10-50% by weight of a ceramic forming mixture comprising at least one ceramic precursor selected from the group consisting of a metal oxide, a metal hydroxide, a metal carbonate, a metal bicarbonate, a metal titanate, a metal zirconate, a metal silicate, and silica; 2-10% by weight of at least one glass additive selected from glass frit, glass fiber, and glass powder; and 15-35% by weight of layered silicate nanoparticles, wherein the rubber is optionally crosslinked, and wherein the flame retardant composition optionally comprises between 1-2% of an antioxidant.

In a first embodiment of the first aspect, provided herein is the flame retardant composition of the first aspect, wherein the rubber is selected from the group consisting of silicone, ethylene vinyl acetate (EVA), and a thermoplastic polyurethane (TPU), natural rubber, isoprene rubber, styrene-butadiene copolymer rubber, polybutadiene rubber, ethylene-propylene-conjugated diene terpolymer rubber, butyl rubber, halogenated butyl rubber, fluorine rubber, epichlorohydrin rubber, acrylonitrile-butadiene rubber, a terpolymer of ethylene, propylene and a diene elastomer (EPDM).

In a second embodiment of the first aspect, provided herein is the flame retardant composition of the first aspect, wherein the rubber is crosslinked with 0.5-3% by weight of a trialkenyl isocyanurate, an alkenyl alkoxy silane, or an aminoalkyl alkoxy silane.

In a third embodiment of the first aspect, provided herein is the flame retardant composition of the first aspect, wherein the intumescent composition is prepared by combining 10-20% weight of melamine, 15-20 by weight of dicyandiamide, 45-55% by weight of formaldehyde, 10-20% by weight of ammonium phosphate, and 1-2% by weight of aluminum hydroxide.

In a fourth embodiment of the first aspect, provided herein is the flame retardant composition of the first aspect, wherein the at least one ceramic precursor comprises at least one metal selected from the group consisting an alkali metal and an alkaline earth metal.

In a fifth embodiment of the first aspect, provided herein is the flame retardant composition of the first aspect, wherein the ceramic forming mixture comprises CaO, $Na_2CO_3$, and $Al(OH)_3$; or $Na_2CO_3$, $Al(OH)_3$, and silica.

In a sixth embodiment of the first aspect, provided herein is the flame retardant composition of the first aspect, wherein the ceramic forming mixture comprises 5-10% weight CaO, 10-15% weight $Na_2CO_3$, and 5-10% by weight of $Al(OH)_3$ relative to the weight of the flame retardant composition; or 5-15% by weight of $Na_2CO_3$, 3-7% by weight of $Al(OH)_3$, and 3-7% by weight of silica relative to the weight of the flame retardant composition.

In a seventh embodiment of the first aspect, provided herein is the flame retardant composition of the first aspect, wherein the layered silicate comprises at least one material selected from the group consisting of mica, montmorillonite and wollastonite.

In an eighth embodiment of the first aspect, provided herein is the flame retardant composition of the first aspect, wherein the flame retardant composition comprises: 30-50% by weight of a rubber selected from the group consisting of silicone, EVA, and TPU, wherein the rubber is crosslinked with 1-2% by weight triallyl isocyanurate; 5-10% by weight of an intumescent composition, wherein the intumescent composition comprises 10-20% by weight of ammonium phosphate and a melamine polymer prepared by combining 10-20% weight of melamine, 15-20 by weight of dicyandiamide, 45-55% by weight of formaldehyde, and 1-2% by weight of aluminum hydroxide; 10-50% by weight of a ceramic forming mixture comprising 5-10% weight CaO, 10-15% weight $Na_2CO_3$, and 5-10% by weight of $Al(OH)_3$; or 5-15% by weight of $Na_2CO_3$, 3-7% by weight of $Al(OH)_3$, and 3-7% by weight of silica; 2-10% by weight glass frit; and 15-35% by weight of a layered silicate selected from the group consisting of montmorillonite and wollastonite.

In a ninth embodiment of the first aspect, provided herein is the flame retardant composition of the eighth embodiment of the first aspect, further comprising 1-2% by weight of a phenolic antioxidant.

In a tenth embodiment of the first aspect, provided herein is the flame retardant composition of the ninth embodiment of the first aspect, wherein the phenolic antioxidant is pentaerythritol tetrakis(3-(3,5-di-tert-butyl-4-hydroxyphenyl)propionate).

In an eleventh embodiment of the first aspect, provided herein is the flame retardant composition of the eighth embodiment of the first aspect, further wherein the flame retardant composition is halogen-free; has a tensile strength between 7-8.5 MPa; an elongation at break between 230-310%; and the gas that is generated when the flame retardant composition is burned has a pH between 6.4-6.6.

In a second aspect, provided herein is a method of preparing the flame retardant composition of the first aspect, the method of comprising: providing an intumescent composition comprising a phosphate and a melamine polymer formed by coming melamine formaldehyde, dicyandiamide, and aluminum hydroxide; combining 5-10% by weight of the intumescent composition with 30-50% by weight of a rubber, 10-50% by weight of a ceramic forming mixture comprising at least one ceramic precursor selected from the group consisting of a metal oxide, a metal hydroxide, a metal carbonate, a metal bicarbonate, a metal titanate, a metal zirconate, a metal silicate, and silica; 2-10% by weight of at least one glass additive selected from glass frit, glass fiber, and glass powder; and 15-35% by weight of layered silicate nanoparticles; and optionally 0.5-3% by weight of a cross-linking agent and 0.1-5% by weight of a radical initiator thereby forming a flame retardant precursor composition; and curing the flame retardant precursor composition thereby forming the flame retardant composition.

In a first embodiment of the second aspect, provided herein is the method of the second aspect, wherein rubber is selected from the group consisting of silicone, ethylene vinyl acetate (EVA), a thermoplastic polyurethane (TPU), natural rubber, isoprene rubber, styrene-butadiene copolymer rubber, polybutadiene rubber, ethylene-propylene-conjugated diene terpolymer rubber, butyl rubber, halogenated butyl rubber, fluorine rubber, epichlorohydrin rubber, acrylonitrile-butadiene rubber, a terpolymer of ethylene, propylene and a diene elastomer (EPDM In a second embodiment of the second aspect, provided herein is the method of the second aspect, wherein the crosslinking agent is selected from the group consisting of a trialkenyl isocyanurate, an alkenyl alkoxy silane, or an aminoalkyl alkoxy silane; and the radical initiator is present at 0.5-3% by weight and the radical initiator is an organic peroxide.

In a third embodiment of the second aspect, provided herein is the method of the second aspect, wherein the intumescent composition is prepared by combining 10-20% weight of melamine, 15-20 by weight of dicyandiamide, 45-55% by weight of formaldehyde, 10-20% by weight of ammonium phosphate, and 1-2% by weight of aluminum hydroxide in the presence of water at a temperature between 40-100° C. thereby forming the intumescent composition.

In a fourth embodiment of the second aspect, provided herein is the method of the second aspect, wherein the ceramic forming mixture comprises 5-10% weight CaO, 10-15% weight $Na_2CO_3$, and 5-10% by weight of $Al(OH)_3$ relative to the weight of the flame retardant composition; or 5-15% by weight of $Na_2CO_3$, 3-7% by weight of $Al(OH)_3$, and 3-7% by weight of silica relative to the weight of the flame retardant precursor composition.

In a fifth embodiment of the second aspect, provided herein is the method of the second aspect, wherein the layered silicate comprises at least one material selected from the group consisting of mica, montmorillonite and wollastonite.

In a sixth embodiment of the second aspect, provided herein is the method of the second aspect, wherein the method comprises: providing an intumescent composition comprising 15-20% by weight of ammonium phosphate and a melamine polymer prepared by combining 13-17% weight of melamine, 15-20% by weight of dicyandiamide, 47-53% by weight of formaldehyde, and 1-1.5% by weight of aluminum hydroxide in the presence of water at a temperature between 40-100° C.; combining 5-10% by weight of the intumescent composition with 30-50% by weight of a rubber selected from the group consisting of silicone, EVA, and TPU, 10-50% by weight of a ceramic forming mixture comprising 5-10% weight CaO, 10-15% weight $Na_2CO_3$, and 5-10% by weight of $Al(OH)_3$; or 5-15% by weight of $Na_2CO_3$, 3-7% by weight of $Al(OH)_3$, and 3-7% by weight of silica; 2-10% by weight glass frit; and 15-35% by weight of layered silicate nanoparticles selected from the group consisting of montmorillonite and wollastonite; and optionally 1-2% by weight of triallyl isocyanurate; 0.3-5% by weight of di(tert-butylperoxyisopropyl)benzene; and 1-2% by weight of pentaerythritol tetrakis(3-(3,5-di-tert-butyl-4-hydroxyphenyl)propionate) thereby forming a flame retardant precursor composition; and curing the flame retardant precursor composition at a temperature of 100-200° C. thereby forming the flame retardant composition.

In a seventh embodiment of the second aspect, provided herein is the method of the sixth embodiment of the second aspect, wherein the step of curing the flame retardant precursor composition is conducted in a mold.

BRIEF DESCRIPTION OF THE FIGURES

The above and other objects and features of the present disclosure will become apparent from the following description of the disclosure, when taken in conjunction with the accompanying drawings.

FIG. 3 lists weight percentage components of exemplary flame retardant compositions Y1-Y10 in accordance with certain embodiments described herein.

FIG. 5 depicts a table showing design of experiment (DOE) parameters evaluated for optimizing mechanical properties of flame retardant compositions described herein comprising silicone rubber.

FIG. 6 depicts a table showing certain physical properties of exemplary flame retardant compositions Y1-Y10.

FIG. 7 depicts a table showing certain physical properties of exemplary flame retardant compositions Y4.

DETAILED DESCRIPTION

Figure 1:
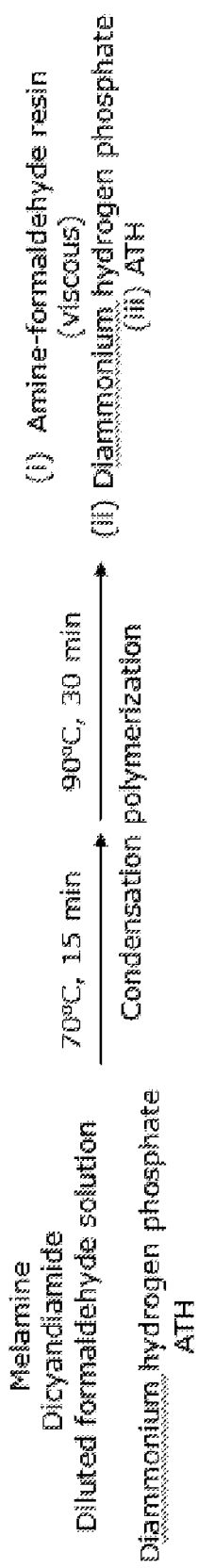
FIG. 1 depicts an exemplary reaction sequence for preparing a mixture comprising a melamine polymer and phosphate salt for use in the preparation of certain embodiments of the flame retardant compositions described herein.
Figure 2:
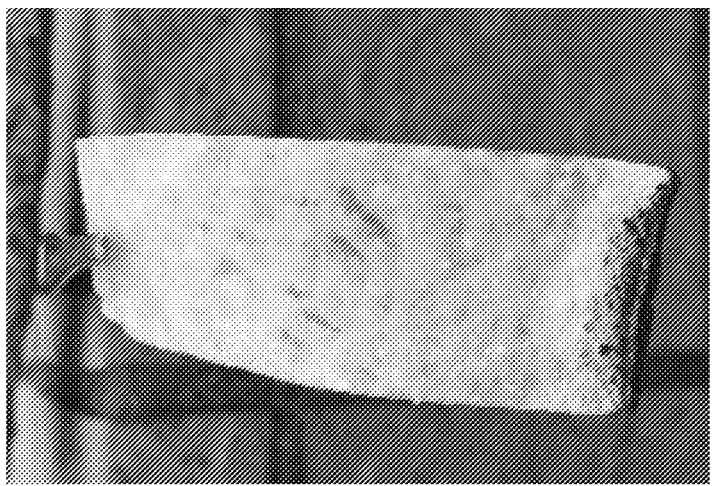
FIG. 2 depicts a photograph showing the results of a vertical burning test of paper with the mixture comprising a melamine polymer and phosphate salt prepared in accordance with the reaction sequence depicted in FIG. 1.

Provided herein are flexible multi-functional flame retardant compositions. The flame retardant compositions comprise a rubber, which allows the flame retardant composition to be readily molded using conventional methods into a desired shape. In certain embodiments, the flame retardant compositions described herein exhibit good mechanical properties, are halogen-free, and when burned emit gases with a pH between 6.4-6.6.

The present disclosure provides a flame retardant composition comprising: 30-50% by weight of a rubber; 5-10% by weight of an intumescent composition comprising a phosphate and a melamine polymer formed by combining melamine, formaldehyde, dicyandiamide, and aluminum hydroxide thereby forming the intumescent composition; 10-50% by weight of a ceramic forming mixture comprising at least one ceramic precursor selected from the group consisting of a metal oxide, a metal hydroxide, a metal carbonate, a metal bicarbonate, a metal titanate, a metal zirconate, a metal silicate, and silica; 2-10% by weight of at least one glass additive selected from glass frit, glass fiber, and glass powder; and 15-35% by weight of layered silicate nanoparticles, wherein the rubber is optionally crosslinked, and wherein the flame retardant composition optionally comprises between 1-2% of an antioxidant.

The rubber used in the flame retardant composition described herein is not particularly restricted and includes natural rubber, isoprene rubber, styrene-butadiene copolymer rubber, polybutadiene rubber, ethylene-propylene-conjugated diene terpolymer rubber, butyl rubber, halogenated butyl rubber, fluorine rubber, epichlorohydrin rubber, acrylonitrile-butadiene rubber, a terpolymer of ethylene, propylene and a diene elastomer (EPDM), EVA, a silicone, and TPU.

Depending on the content and ratio of the monomers present in the EVA polymer, EVA can have thermoplastic or elastomeric properties. As the percentage of vinylacetate repeating units on the polyethylene backbone increases, the composition switches from a thermoplastic to an elastomer. As the polyethylene backbone nears saturation with vinylacetate, the composition becomes a thermoplastic. Generally, the middle range, e.g., between 33% and 80% vinylacetate on the polyethylene backbone, is where the composition is an elastomer. The fire retardancy of EVA can also depend on the vinylacetate content, which increases with increasing vinylacetate content.

Silicone rubbers are generally regarded as flame retardant in nature due to their chemical structure. In certain embodiments, the silicone comprise the structure:

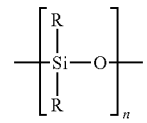

wherein n is a whole number between 1,000-1,000,000; and R for each occurrence is independently optionally substituted alkyl (e.g., methyl, ethyl, propyl, and butyl), optionally substituted alkenyl (e.g., vinyl and allyl), optionally substituted cycloalkyl (e.g., cyclopentyl and cyclohexyl), optionally substituted aryl (e.g., phenyl), and optionally substituted araalkyl (e.g., benzyl). In certain embodiments, silicone has a molecular weight greater than 500,000 amu. In certain embodiments, silicone has a molecular weight greater than 500,000 to 4,000,000 amu, 500,000 to 3,000,000 amu, 500,000 to 2,000,000 amu, or 500,000 to 1,000,000 amu.

In instances in which the flame retardant composition comprises a silicone rubber, when the flame retardant composition burns the combustible chemical groups in the silicone rubber (e.g., the hydrocarbon groups) combust leaving behind Si—O containing materials, which can contribute to the flame retardant and/or thermal insulating properties of the resulting char/ceramic material.

TPU polymers are known in the art and are typically obtained by the reaction of a linear or branched hydroxy-terminated polyol, (e.g., polyester polyols or polyether polyols), an organic diisocyanate or polyisocyanate, and optionally a chain extender (often a short chain diol or polyol).

The rubber can be present in the flame retardant composition between 30-50% by weight. In certain embodiments, the rubber is present in the flame retardant composition between 35-50%, 40-50%, 45-50%, 30-45%, 30-40%, 30-35%, 35-45%, or 38-46% by weight of the flame retardant composition.

In certain embodiments, the rubber is crosslinked. The rubber can be crosslinked directly or crosslinked via an optional crosslinking agent. Examples of such crosslinking agents include polyallyl crosslinking agents, such as TAIC, triallyl cyanurate (TAC), triallyl trimellitate (TATM), triallyl orthoformate, pentaerythritol triallyl ether, triallyl citrate, and triallyl aconitate; ethoxylated bisphenol A dimethacrylate; α-methyl styrene dimer (AMSD); acrylate-based crosslinking agents, such as trimethylolpropane triacrylate (TMPTA), trimethylolpropane trimethylacrylate (TMPTMA), 1,6-hexanediol diacrylate, pentaerythritol tetraacrylate, dipentaerythritol pentaacrylate, tris(2-hydroxyethyl) isocyanurate triacrylate, and propoxylated glyceryl triacrylate; vinyl-based coagents, such as polybutadiene having a high 1,2-vinyl content, and trivinyl cyclohexane ("TVCH").

In certain embodiments, the crosslinking agent is a trialkenyl isocyanurate or a dialkenyl isocyanurate represented by the structure:

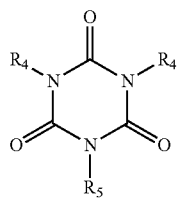

wherein each $R_4$ is independently an alkene and $R_5$ is hydrogen, alkyl, cycloalkyl, alkene, aryl, or aralkyl. In certain embodiments, each $R_4$ and $R_5$ is independently a $C_3$-$C_{12}$ alkene, $C_3$-$C_{10}$ alkene, $C_3$-$C_8$ alkene, $C_3$-$C_6$ alkene. In certain embodiments, each $R_4$ and $R_5$ is independently an alkene. In certain embodiments, each $R_4$ is independently an alkene; and $R_5$ is alkyl or aryl.

In certain embodiments, the crosslinking agent is an alkenyl alkoxy silane comprising the structure:

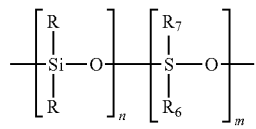

wherein n is a whole number between 1-10; m is a whole number selected from 1-10; R for each occurrence is independently optionally substituted alkyl (e.g., methyl, ethyl, propyl, and butyl), optionally substituted alkenyl (e.g., vinyl and allyl), optionally substituted cycloalkyl (e.g., cyclopentyl and cyclohexyl), optionally substituted aryl (e.g., phenyl), and optionally substituted araalkyl (e.g., benzyl); $R_6$ is an alkene; and $R_7$ is alkyl, cycloalkyl, alkenyl, aryl, or aralkyl.

In certain embodiments, the crosslinking agent is an aminoalkyl alkoxy silane represented by the structure: $NH_2(C(R_8)_2)_pSi(OR_9)_3$, wherein p is a whole number between 2-10; $R_8$ for each instance is independently hydrogen or alkyl; and R for each instance is alkyl. In certain embodiments, p is 2-8, 2-6, or 2-4. In certain embodiments, p is 2-8, 2-6, or 2-4; $R_8$ is hydrogen; and $R_9$ is $C_1$-$C_6$ alkyl, $C_1$-$C_4$ alkyl, $C_2$-$C_4$ alkyl, or $C_1$-$C_2$ alkyl. In certain embodiments, the crosslinking agent is 3-(triethoxysilyl)propan-1-amine, 3-(trimethoxysilyl)propan-1-amine, or 2-(triethoxysilyl)ethan-1-amine, 2-(trimethoxysilyl)ethan-1-amine.

Advantageously, alkenyl alkoxy silane or aminoalkyl alkoxy silane crosslinking agents are capable of crosslinking the rubber, silica, and/or silicate components of the flame retardant composition, which can further improve the physical properties of the flame retardant composition.

As used herein, "organic peroxide" denotes a peroxide having the structure: $R_1OOR_2$, or $R_1OOR_3OOR_2$, where each of $R_1$ and $R_2$ is independently a hydrocarbyl moiety, and $R_3$ is a hydrocarbylene moiety. As used herein, "hydrocarbyl" denotes a univalent group formed by removing a hydrogen atom from a hydrocarbon (e.g., alkyl, cycloalkyl, aryl, and aralkyl), which optionally has one or more heteroatoms. As used herein, "hydrocarbylene" denotes a bivalent group formed by removing two hydrogen atoms from a hydrocarbon, which optionally has one or more heteroatoms. The organic peroxide can be any dialkyl, diaryl, dialkaryl, or diaralkyl peroxide, having the same or differing alkyl, aryl, alkaryl, or aralkyl moieties. In certain embodiments, each of $R_1$ and $R_2$ is independently a $C_1$-$C_{20}$ alkyl, $C_1$-$C_{12}$ alkyl, $C_1$-$C_{12}$ alkyl, $C_6$-$C_{10}$ aryl, $C_7$-$C_{20}$ alkaryl, or $C_7$-$C_{20}$ aralkyl moiety. In certain embodiments, R is $C_2$-$C_{20}$ or $C_1$-$C_{12}$ alkylene, arylene, alkarylene, or aralkylene moiety. Exemplary organic peroxides include dicumyl peroxide ("DCP"); tert-butyl peroxybenzoate; di-tert-amyl peroxide ("DTAP"); bis(alpha-tert-butyl-peroxyisopropyl) benzene ("BIPB"); isopropylcumyl tert-butyl peroxide; tert-butylcumylperoxide; di-tert-butyl peroxide; 2,5-bis(tert-butylperoxy)-2,5-dimethylhexane; 2,5-bis(tert-butylperoxy)-2,5-dimethylhexyne-3; 1,1-bis(tert-butylperoxy)-3,3,5-trimethylcyclohexane; isopropylcumyl cumylperoxide; butyl 4,4-di(tert-butylperoxy) valerate; di(isopropylcumyl) peroxide; and mixtures thereof. In an embodiment, the organic peroxide is di(tert-butylperoxyisopropyl)benzene.

The ratio of the components of the flame retardant composition described herein should be balanced to obtain an optimal effect. The amount of each component of the flame retardant composition depends on various factors including the properties of the intumescent composition and the ceramic forming mixture, the nature of the rubber material and the degree of intumescency and flame retardancy desired. The optimal ratio of the components of the flame retardant composition and the selection of the rubber can be determined by the skilled person based on the teachings herein and through routine experiments.

The flame retardant composition comprises an intumescent composition. Intumescent materials can swell when exposed to fire or heat forming a porous foamed mass, usually carbonaceous, which in turn acts as a barrier to heat, air and pyrolysis product. Intumescent compositions typically comprise a char forming agent, a catalyst as blowing agent and a foaming agent. Intumescent compositions containing melamine phosphates, which, to some extent, perform the three roles as foaming agent, catalyst and char forming agent.

The intumescent composition can comprise a phosphate and a melamine polymer. The flame retardant composition can comprise 5-10% by weight of the intumescent composition. In certain embodiments, the flame retardant composition comprises 6-10%, 7-10%, 8-10%, 9-10%, 5-9%, 5-8%, 5-7%, 5-6%, 6-9, or 7-8% by weight.

The melamine polymer can be prepared by the condensation of melamine, formaldehyde, and dicyandiamide. In certain embodiments, the condensation reaction occurs in the presence of $Al(OH)_3$ thereby forming the intumescent composition. In alternative embodiments, melamine, formaldehyde, and dicyandiamide are condensed and then $Al(OH)_3$ is added.

In certain embodiments, the intumescent composition is prepared by combining 10-20% weight of melamine, 15-20 by weight of dicyandiamide, 45-55% by weight of formaldehyde, 10-20% by weight of phosphate, and 1-2% by weight of aluminum hydroxide in an intumescent composition precursor mixture. The components of the intumescent composition precursor mixture can be then allowed to react thereby forming the intumescent composition.

Phosphates can act in the condensed phase promoting char formation on the surface, which acts as a barrier to inhibit gaseous products from diffusing to the flame and to shield the rubber surface from heat and air.

The intumescent composition comprises a phosphate. The phosphate can be represented by $(M^{q+})_3(PO_4)_q$, wherein M for each instance is independently hydrogen, a group 1 metal, a group 2 metal, or $N(R)_4$, wherein R is alkyl or hydrogen; and q is 1 or 2. In certain embodiments, the phosphate is a $Li^+$, $Na^+$, $K^+$, $Mg^{2+}$, $Ca^{2+}$, or $NH_4^+$ salt of $PO_4^{3-}$, $HPO_4^{2-}$, or $H_2PO_4^{1-}$. In certain embodiments, the phosphate is $(NH_4)_3(PO_4)$. The intumescent composition can be prepared by combining the phosphate at 10-20% by weight. In certain embodiments, the intumescent precursor composition can comprise the phosphate at 11-20%, 12-20%, 13-20%, 14-20%, 15-20%, 16-20%, 17-20%, 18-20%, 19-20%, 13-20%, 14-20%, 15-19%, 16-18% by weight.

The intumescent precursor composition can comprise 10-20% by weight of melamine. In certain embodiments, intumescent precursor composition comprises 11-20%, 12-20%, 13-20%, 14-20%, 15-20%, 16-20%, 17-20%, 18-20%, 19-20%, 10-20%, 10-19%, 10-18%, 10-17%, 10-16%, 10-15%, 10-14%, 10-13%, 10-12%, 10-11%, 12-18%, or 14-16% by weight of melamine.

The intumescent precursor composition can comprise 15-20% by weight of dicyandiamide. In certain embodiments, intumescent precursor composition comprises 16-20%, 17-20%, 18-20%, 19-20%, 15-19%, 15-18%, 15-17%, 15-16%, 16-19%, 16-18%, or 17-18% by weight of dicyandiamide.

The intumescent precursor composition can comprise 45-55% by weight of formaldehyde. Formaldehyde is well known to spontaneously oligomerize and/or form hydrates and can thus exist in multiple forms. All such forms are within the contemplation of the present disclosure. In certain embodiments, the formaldehyde can exist in one or more forms selected from the group consisting of 1,3,5-trioxane, methyleneglycol, oligomethyleneglycol, and polymethyleneglycol (paraformaldehyde). In certain embodiments, intumescent precursor composition comprises 46-55%, 47-55%, 48-55%, 49-55%, 50-55%, 51-55%, 52-55%, 53-55%, 54-55%, 45-54%, 45-53%, 45-52%, 45-51%, 45-50%, 45-49%, 45-48%, 45-47%, 45-46%, 46-54%, 47-53%, 48-52%, or 49-51% by weight of formaldehyde.

Aluminum hydroxide releases about 80% by weight of crystallization water when heated at a temperature between 200° C. and 300° C., when it is contained in the flame retardant composition, the burning temperature is lowered by this endothermic reaction of aluminum hydroxide. The flame retardant compositions described herein can be prepared using intumescent mixtures comprising aluminum hydroxide and optionally ceramic forming precursors comprising aluminum hydroxide.

The intumescent precursor composition can comprise 1-2% by weight of aluminum hydroxide. In certain embodiments, intumescent precursor composition comprises 1-1.9%, 1-1.8%, 1-1.7%, 1-1.6%, 1-1.5%, 1-1.4%, 1-1.3%, 1-1.2%, 1-1.1%, 1.1-2%, 1.2-2%, 1.3-2%, 1.4-2%, 1.5-2%, 1.6-2%, 1.7-2%, 1.8-2%, 1.9-2%, 1.1-1.4%, or 1.1-1.3% by weight of aluminum hydroxide.

The flame retardant composition can comprise a ceramic forming mixture that upon burning forms a ceramic material that provides a thermal insulating effect and physical barrier that inhibits the spread of a fire. After burning at 950° C. for 3 hrs, the photos in FIG. 1 demonstrate that the ceramic structure is formed after burning and there is no broken surface.

Figure 4:
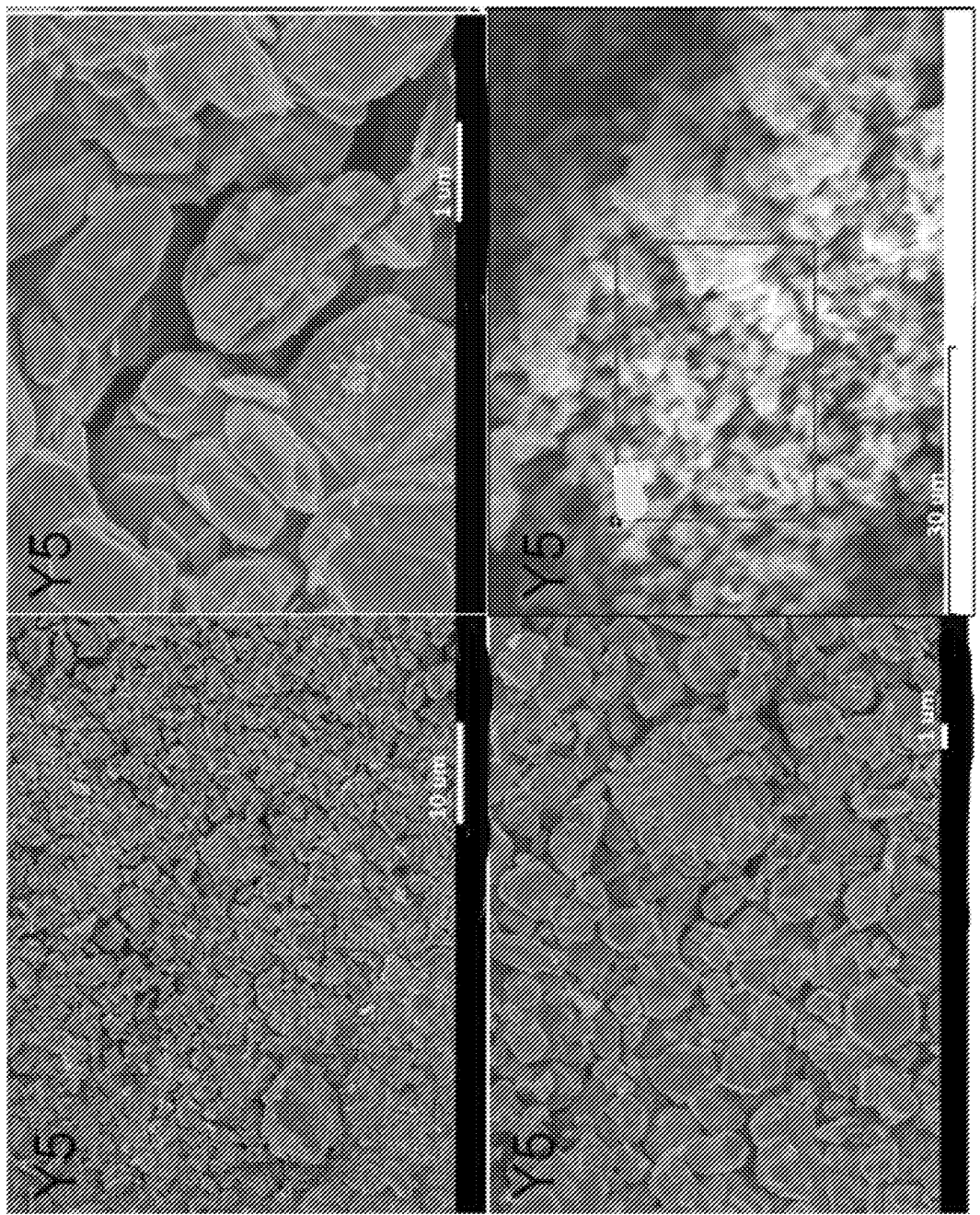
FIG. 4 depicts scanning electron microscopy photographs of exemplary flame retardant compositions Y5 before and after burning showing the formation of hard char $Al_2O_3$.
Figure 8:
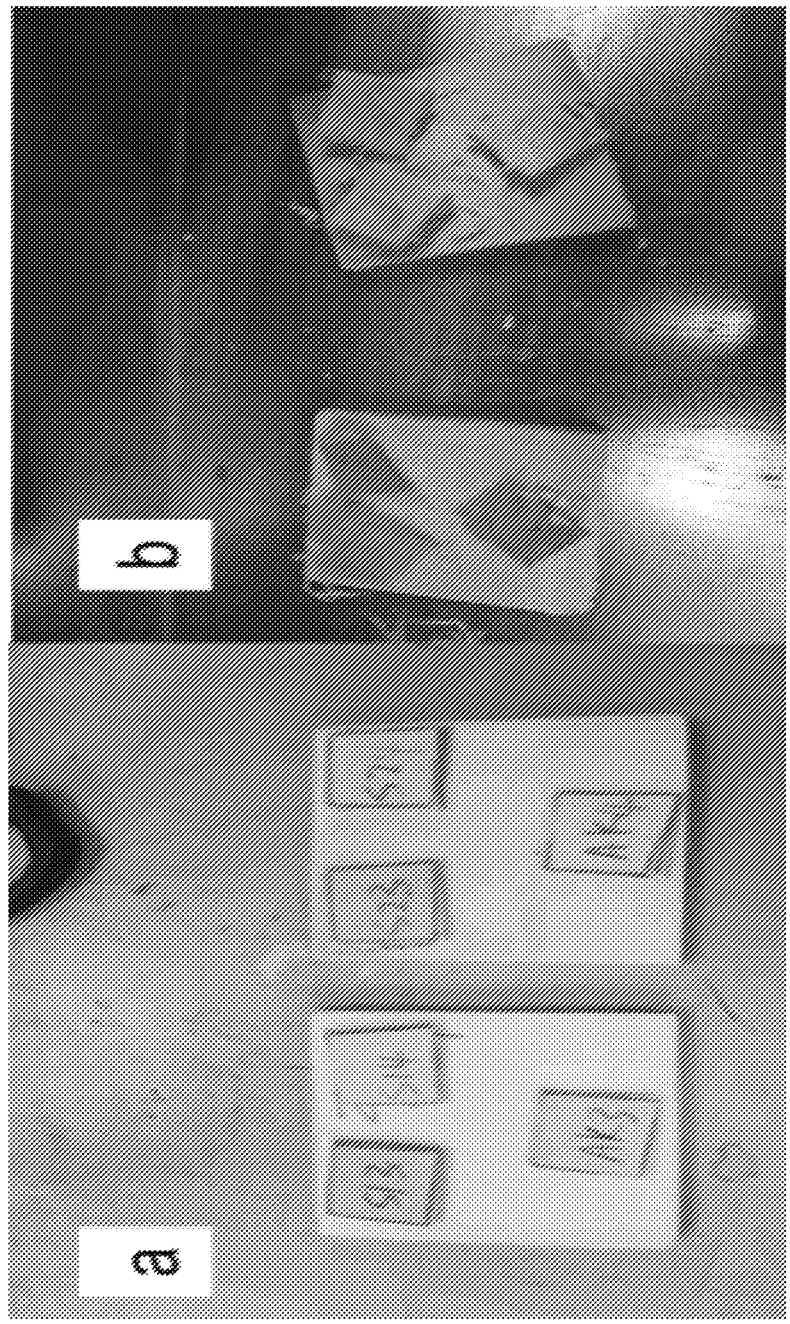
FIG. 8 depicts photographs of the flame retardant composition according to certain embodiments described herein (a) before and (b) after burning showing a continuous ceramic shield that is formed from the ceramic forming mixture.

Design of Experiment (DOE) was used to evaluate the impact of varying amounts of the components of the flame retardant composition without the intumescent composition present (FIG. 3) on the formation of the ceramic shielding material upon burning. It was found that sample Y5 formed the most durable ceramic shielding when burned as demonstrated in FIG. 4.

In another DOE, the mechanical properties of composites formed using varying ratios of wollastonite and white carbon black (fumed silica) in a test composite prepared comprising the same (FIGS. 5 and 6). L4 was found to exhibit the optimal ratio of wollastonite to white carbon black to A172 (triethoxyvinylsilane).

As a result of the mechanical properties of certain embodiments of the flame retardant composition, it can exist as soft and flexible material at room temperature, can be converted to a hard and porous ceramic structure that can provide thermal insulation and fire-proofing upon heating.

The flame retardant composition can comprise 10-50% by weight of a ceramic forming mixture. The ceramic forming mixture can comprise at least one ceramic precursor selected from the group consisting of a metal oxide, a metal hydroxide, a metal carbonate, a metal bicarbonate, a metal titanate, a metal zirconate, a metal silicate, and silica. The at least one ceramic precursor can comprise one or more metals selected from the group consisting of group 1, group 2, group 4, group 8, and group 13 metals. Exemplary metals useful in ceramic precursors include, but are not limited to Li, Na, K, Mg, Ca, Ti, Fe, and Al. In certain embodiments, the at least one ceramic precursor is selected from the group consisting of Li, Na, K, Mg, Ca, and Al carbonates, bicarbonates, titanates, and zirconates. In certain embodiments, the ceramic forming mixture comprises CaO, $Na_2CO_3$, and $Al(OH)_3$; or $Na_2CO_3$, $Al(OH)_3$, and silica.

In certain embodiments, the flame retardant composition comprises 10-45%, 10-40%, 10-35%, 11-35%, 10-30%, 10-25%, 10-20%, 10-15%, 15-45%, 20-45%, 25-45%, 30-45%, 35-45%, or 40-45% by weight of the ceramic forming mixture.

In certain embodiments, the flame retardant composition comprises 5-10%, 5-10%, 6-10%, 8-10%, 9-10%, 5-9%, 5-8%, 5-7%, 5-6%, 6-9%, or 7-8% weight CaO; 10-15%, 10-14%, 10-13%, 10-12%, 10-11%, 11-15%, 12-15%, 13-15%, 14-15%, 11-14%, or 12-13% weight $Na_2CO_3$; and 5-10%, 5-10%, 6-10%, 8-10%, 9-10%, 5-9%, 5-8%, 5-7%, 5-6%, 6-9%, or 7-8% by weight of $Al(OH)_3$ relative to the weight of the flame retardant composition.

In certain embodiments, the flame retardant composition comprises 10-15%, 10-14%, 10-13%, 10-12%, 10-11%, 11-15%, 12-15%, 13-15%, 14-15%, 11-14%, or 12-13% by weight of $Na_2CO_3$; 3-7%, 3-6%, 3-5%, 3-4%, 4-7%, 6-7%, or 4-6% by weight of $Al(OH)_3$; and 3-7%, 3-6%, 3-5%, 3-4%, 4-7%, 6-7%, or 4-6% by weight of silica relative to the weight of the flame retardant composition.

Advantageously, when the intumescent composition and the ceramic forming mixture are included in the flame retardant composition in the quantities described herein, these components can act synergistically to improve its flame retardant properties. When the intumescent composition decomposes under heat it can release a blowing agent that can contribute to the formation of pores within the formed ceramic structure thereby increasing the thermal insulation and fire-proofing of the combusted material after heating. The resulting porous ceramic structure exhibits improved flame retardant properties than denser ceramic structures formed in the absence of an intumescent composition.

Layered silicates (e.g., clay) can improve the flame retardancy of a material due to the slowdown of burning process, because charring is promoted thanks to the ablative reassembling of the silicate.

The flame retardant composition can comprise 15-35% by weight of a layered silicate. In certain embodiments, the layered silicate is a powder. The layered silicate powder can have an average particle size less 100 µm, less 50 µm, less 10 µm, less 1 µm, less 100 nm, or less than 10 nm. In certain embodiments, the layered silicate powder has an average particle size between 1 nm to 100 µm, 1 nm to 50 µm, 1 nm to 10 µm, 1 nm to 10 µm, 1 nm to 1 µm, 1 nm to 100 nm, 10 nm to 100 nm, or 50 nm to 100 nm.

The layered silicate can be selected from the group consisting of montmorillonite, magadiite, fluorinated synthetic mica, saponite, fluorhectorite, laponite, sepiolite, attapulgite, hectorite, beidellite, vermiculite, kaolinite, nontronite, volkonskoite, stevensite, pyrosite, sauconite, and kenyaite. The layered silicate can be naturally occurring or synthetic.

The flame retardant composition may also comprise of at least one glass additive selected from glass frit, glass fiber, and glass powder. Glass fibers, powder, and frit can improve the strength of the resulting char that is formed when the flame retardant composition is burned. Glass can melt above 400° C. and upon cooling can form a rigid glassy phase that aids in increasing char strength of the intumesced material.

The at least one glass additive can act as a binding agent in the flame retardant composition. When the flame retardant composition is heated to a temperature above the melting point of the at least one glass additive, the at least one glass additive can melt and when it solidifies it can serve as a binder and together with the ceramic forming mixture component of the flame retardant composition can form a physical barrier with thermal insulating properties that can inhibit the spread of a fire.

In certain embodiments, the flame retardant composition comprises more than one type of glass additive. In certain embodiments, the flame retardant composition comprises two types of glass frit with the first glass frit having a melting point of 450-500° C. and the second glass frit having a melting point of 500-600° C.

The flame retardant composition can comprise between 2-10% by weight of the at least one glass additive. In certain embodiments, the flame retardant composition comprises between 3-10%, 4-10%, 5-10%, 6-10%, 7-10%, 8-10%, 9-10%, 2-9%, 2-8%, 2-7%, 2-6%, 2-5%, 2-4%, 2-3%, 3-9%, 4-8%, 5-7%, or 6-7% by weight of the at least one glass additive.

In certain embodiments, the at least one glass additive is selected from the group consisting of a glass frit having a melting point of 450-500° C., a glass frit having a melting point of 500-600° C., and white carbon black (fumed silica).

In addition, the flame retardant composition described herein may contain other additives such as antioxidants, stabilizers, blowing agents, carbon black, pigments, processing aids, peroxides, cure boosters, scorch inhibitors, and surface active agents to treat fillers may be present.

The flame retardant composition can comprise between 1-2% by weight of an antioxidant. In certain embodiments, the flame retardant composition can comprise between 1-1.9%, 1-1.8%, 1-1.7%, 1-1.6%, 1-1.5%, 1-1.4%, 1-1.3%, 1-1.2%, 1.1-2%, 1.2-2%, 1.3-2%, 1.4-2%, 1.5-2%, 1.6-2%, 1.7-2%, 1.8-2%, 1.9-2%, 1.1-1.9%, 1.2-1.8%, 1.3-1.7%, or 1.4-1.6% by weight of the antioxidant.

In certain embodiments, the antioxidant is a phenolic antioxidant. Exemplary phenolic antioxidants include, but are not limited to The following are examples of such phenolic antioxidants: 2,6-di-tert-butyl-4-methylphenol, 2,6-di-tert-butylphenol, 2-tert-butyl-4,6-dimethylphenol, 2,6-di-tertbutyl-4-ethylphenol, 2,6-di-tert-butyl-4-isobutylphenol, 2,6-bis(alpha-methylbenzyl)-4-methylphenol, 2-alpha-methylbenzyl-4-methylphenol, 2,4,6,-tricyclohexylphenol, 2,6-di-tert-butyl-4-methoxymethylphenol and the like; 2,5-di-tert-buryl-hydroquinone, 2,5-di-tert-amyl-hydroquinone and the like; 2,2'-thiobis(6-tert-butyl-4-methylphenol), 2,2'-thiobis(4-octylphenol), 4,4'-thiobis(6-tert-buty 1-3 -methylphenol), 4,4'-thiobis(6-t-butyl-2-0233-PA methylphenol) and the like; 2,2'-methylenebis(6-tert-butyl-4-methylphenol), 2,2'-methylenebis[4-methyl-6-(α-methylcyclohexyl)phenol], 2,2'-methylenebis(4-methyl-6-cyclohexylphenol), 2,2'-methylenebis(4,6-di-tert-butylphenol), 4,4'-methylenebis(2,6-di-tert-butylphenol), 1,1-bis(5-tert-butyl-4-hydroxy-2-methylphenyl)butane, di(3-tert-butyl-4-hydroxy-5-methylphenyl)dicyclopentadiene, ethylene glycol bis[3,3-bis(3'-tert-butyl-4'-hydroxylphenyl)butyrate] and the like; 1,3,5-tris(3,5-di-tert-butyl-4-hydroxybenzyl)-2,4,6-trimethyl-benzene, di(3,5-di-tert-butyl-4-hydroxybenzyl) sulfide, 3,5-di-tert-butyl-4-hydroxybenzylmercaptoacetic acid isooctyl ester, and 3,5-di-tert-butyl-4-hydroxybenzylphosphonic acid dioctadecyl ester. In certain embodiments, the phenolic antioxidant is pentaerythritol tetrakis(3-(3,5-di-tert-butyl-4-hydroxyphenyl)propionate).

The flame retardant composition can further comprise a dispersion agent to assist with blending the various components of the flame retardant precursor composition. The dispersion agent can be present at 1-2% by weight in the flame retardant composition. In certain embodiments, the dispersion agent is zinc stearate.

The present disclosure also provides articles comprising the flame retardant compositions described. Exemplary articles include rods, beams, pipes, hoses, non-tubular profiles and panels.

The flame retardant composition can also be applied as a coating (e.g., a thin coating or thick coating) to a substrate surface. Application of such a coating can impart flame retardant properties to the surface. In such instances, the flame retardant composition can be applied to walls, pipes, beams, and the like. In instances in which the flame retardant coating is applied as a coating to a substrate surface, the substrate can be any substrate known in the art, such as iron, steel, stainless steel, aluminum, and other non-ferrous metals, wood, plywood, particle board, and other wood by-products, plastics, PVC, thermoplastics, epoxies, and composites The present disclosure also provides a method for preparing the flame retardant compositions described herein. In certain embodiments, the method comprises providing an intumescent composition comprising a phosphate and a melamine polymer formed by coming melamine formaldehyde, dicyandiamide, and aluminum hydroxide; combining 5-10% by weight of the intumescent composition with 30-50% by weight of a rubber, 15-50% by weight of a ceramic forming mixture comprising at least one ceramic precursor selected from the group consisting of a metal oxide, a metal hydroxide, a metal carbonate, a metal bicarbonate, a metal titanate, a metal zirconate, a metal silicate, and silica; 2-10% by weight of at least one glass additive selected from glass frit, glass fiber, and glass powder; and 15-35% by weight of layered silicate nanoparticles; and optionally 0.5-3% by weight of a crosslinking agent and 0.1-5% by weight of a radical initiator thereby forming a flame retardant precursor composition; and curing the flame retardant precursor composition thereby forming the flame retardant composition.

The intumescent composition can be prepared by combining the phosphate, melamine, formaldehyde, dicyandiamide, and Al(OH)$_3$ thereby forming an intumescent precursor composition in the presence of water thereby forming the intumescent composition. The order of addition of each component of the intumescent precursor composition is not limited and all orders of addition are contemplated by the present disclosure. The components can be added in the weight percentages described herein.

In certain embodiments, the phosphate, melamine, formaldehyde, dicyandiamide, and Al(OH)$_3$ thereby forming an intumescent precursor composition in the presence of water at a temperature of between 40-100° C., 50-100° C., 60-100° C., 70-100° C., or 80-100° C. In certain embodiments, the temperature is varied between one or more temperatures selected from a first temperature between 60-80° C. and a second temperature between 80-100° C. The condensation reaction mixture can then be dried using conventional techniques to yield the dried intumescent composition, which can optionally be milled to yield an intumescent composition powder.

In certain embodiments, the melamine polymers can be prepared in a two stage process with a 1:2-12 molar ratio of melamine to formaldehyde. Various methylol derivatives of melamine are formed during the first stage at a temperature of 80-90° C. and pH 8.5; the second stage involves subsequent polycondensation of the products in, e.g., an aqueous acidic solvent. For example, the reaction mixture must be cooled to 50-60° C. and a certain quantity of acid added to produce melamine polymers with the highest industrial value.

Melamine polymers can be amorphous white products that are readily soluble in water but insoluble in organic solvents. The methylol groups in the polymers can undergo condensation reactions with alcohols, primarily n-butanol and methanol, to impart to them hydrophobic properties, solubility in organic solvents (during the preparation of varnishes), and the ability to combine with plasticizers. Melamine polymers can be cured at high temperatures, or at room temperature in the presence of slightly acidic catalysts. Of course, minor amounts of impurities may be present in these resins derived, possible from the process used for preparing the same. In another embodiment according to the present invention, the fibers are comprised of melamine-aldehyde resins which are condensed or mixed with other fiber-forming polymers. The fibers of this embodiment can contain at least 60 weight percent, preferably 70 weight percent, of the melamine-aldehyde resins described below, based on the entire weight of the fiber. Thus, the fibers of the present invention are to be distinguished from fibers which contain minor amounts of melamine aldehyde resins or which are coated with such resins.

The intumescent composition can then be combined with the rubber, the ceramic forming mixture, the at least one glass additive; and the layered silicate nanoparticles; and optionally a crosslinking agent and a radical initiator thereby forming a flame retardant precursor composition, which can then be cured. The temperature that the components of the flame retardant precursor composition is not particularly limited, but is generally conducted below the curing temperature. In certain embodiments, the components of the flame retardant precursor composition are combined at room temperature.

The order of addition of the components of the flame retardant precursor composition is not limited and all orders of addition, including concurrent addition of all components, are contemplated by the present disclosure.

In certain embodiments, 5-10% by weight of the intumescent composition; 30-50% by weight of a rubber, 15-50% by weight of a ceramic forming mixture comprising at least one ceramic precursor selected from the group consisting of a metal oxide, a metal hydroxide, a metal carbonate, a metal bicarbonate, a metal titanate, a metal zirconate, a metal silicate, and silica; 2-10% by weight of at least one glass additive selected from glass frit, glass fiber, and glass powder; and 15-35% by weight of layered silicate nanoparticles; and optionally 0.5-3% by weight of a crosslinking agent and 0.1-5% by weight of a radical initiator are combined thereby forming a flame retardant precursor composition; and then the flame retardant precursor composition is cured thereby forming the flame retardant composition.

Depending of the physical chemical properties of flame retardant precursor composition, it can be cured at a temperature between 23-200° C. In certain embodiments, the flame retardant precursor composition is cured at a temperature between 50-200° C., 100-200° C., 150-200° C., 150-180° C., or 160-180° C.

The flame retardant composition described herein can be formed in to an article using any conventional technique known in the art, such as a molding process. Examples of the molding process are a thermal molding process selected from blow molding, extrusion blow molding, extrusion stretch blow molding, injection blow molding, injection stretch blow molding, thermoforming, vacuum stretch forming, pressure stretch forming, injection molding, and rotary thermoforming, these being processes in which a mold is used to mold a molding composition.

Molding can be conducted before curing the flame retardant precursor composition, concurrently with curing the flame retardant precursor composition (e.g., by the application of heat and a molding processing at the same time), or after curing the flame retardant precursor composition.

EXAMPLES

Example 1—Preparation of Intumescent Powder

Into a versatile mixer (made of stainless steel), 3.6 g (4.92 mol) of melamine, 4 g of dicyandiamide and 0.3 g of aluminum hydroxide were taken and mixed for 10 minutes. To this mixture of melamine, 4.2 g of ammonium phosphate an aqueous solution containing 12 g of formaldehyde solution and 3 g of water was added and mixed for 15 minutes with stirring at 70° C. and 15 minutes at 90° C. By additional 0.2 g of EtOH to stir addition 5 minutes at 90° C., its aqueous solution becomes jelly-like. And put the solution in the oven for 80° C. overnight until the solution is dried. Then grind the dried resins to fine powder.

Example 2—Preparation of EVA Based Flame Retardant Composite

The intumescent powder of Example 1 (5-10% w/w), Dupont 2805 EVA with 28% vinyl acetate content and melt flow index of 6 g/10 min (38-46% w/w), wollastonite (CaSiO$_3$), (15-25% w/w), CaO (5-10% w/w), Na$_2$CO$_3$ (3,000 mesh, 10-15% w/w), aluminum hydroxide (5-10% w/w), calcium silicate (5-8% w/w), glass frit (3-7% w/w), zinc stearate (1-2% w/w), triallyl isocyanurate (TAIC) (0.5-1.5% w/w), 3-(triethoxysilyl)propan-1-amine (KH550) (0.5-3% w/w), di(tert-butylperoxyisopropyl)benzene (14-40B) (3-5% w/w), and pentaerythritol tetrakis(3-(3,5-di-tert-butyl-4-hydroxyphenyl)propionate) (Irganox 1010) (1-2% w/w) were mixed together by extruder and added into a square mold in the liquid phase and cured at 170° C. for 2 minutes.

Example 3—Preparation of Silicone Based Flame Retardant Composite

The intumescent powder of Example 1 (5-10% w/w), KCC1040 silicone rubber with a least portion of vinyl as substituent (30-45% w/w) poly, montmorillonite powder (25-35% w/w), silica (3-7% w/w), $Na_2CO_3$ (5-15% w/w), glass frit (5-10% w/w), aluminum hydroxide (5-10% w/w), KH550 (1-3% w/w), 14-40B (2-6% w/w), and Irganox 1010 (1-2% w/w) were mixed together by extruder and added into a square mold in the liquid phase and cured at 170° C. for 2 minutes.

Example 4—Testing Flame Retardant Composite

After curing, square and flat shaped solid samples were obtained. After burning at 950° C. for half an hour, the combustible components of the rubber had decomposed and/or burnt out leaving behind a porous ceramic structure formed from the ceramic forming mixture and the blowing properties of the intumescent composition. The porous ceramic structure can withstand exposure to high temperatures above 950° C. for several hours without fracturing. It was dense and exhibited no cracking.

What is claimed is:

1. A flame retardant composition comprising: 30-50% by weight of a rubber; 5-10% by weight of an intumescent composition comprising a phosphate and a melamine polymer formed by combining melamine, formaldehyde, dicyandiamide, and aluminum hydroxide thereby forming the intumescent composition; 10-50% by weight of a ceramic forming mixture comprising CaO, $Na_2CO_3$, and $Al(OH)_3$; or the ceramic forming mixture comprises $Na_2CO_3$, $Al(OH)_3$, and silica; 2-10% by weight of at least one glass additive selected from glass frit, glass fiber, and glass powder; and 15-35% by weight of layered silicate nanoparticles, wherein the rubber is optionally crosslinked, the flame retardant composition optionally comprises between 1-2% by weight of an antioxidant, and the weight percentages of the rubber, the intumescent composition, the ceramic forming mixture, the at least one glass additive, the layered silicate nanoparticles, and optionally the antioxidant are based on the total weight of the rubber, the intumescent composition, the ceramic forming mixture, the at least one glass additive, the layered silicate nanoparticles, and optionally the antioxidant in the flame retardant composition.

2. The flame retardant composition of claim 1, wherein the rubber is selected from the group consisting of silicone, ethylene vinyl acetate, a thermoplastic polyurethane, natural rubber, isoprene rubber, styrene-butadiene copolymer rubber, polybutadiene rubber, ethylene-propylene-conjugated diene terpolymer rubber, butyl rubber, halogenated butyl rubber, fluorine rubber, epichlorohydrin rubber, acrylonitrile-butadiene rubber, and a terpolymer of ethylene, propylene and a diene elastomer.

3. The flame retardant composition of claim 1, wherein the rubber is crosslinked with a trialkenyl isocyanurate, an alkenyl alkoxy silane, or an aminoalkyl alkoxy silane, wherein the crosslinker is present at 0.5-3% by weight based on the total weight of the crosslinked rubber, the intumescent composition, the ceramic forming mixture, the at least one glass additive, the layered silicate nanoparticles, and optionally the antioxidant in the flame retardant composition.

4. The flame retardant composition of claim 1, wherein the intumescent composition is prepared by combining 10-20% by weight of melamine, 15-20% by weight of dicyandiamide, 45-55% by weight of formaldehyde, 10-20% by weight of ammonium phosphate, and 1-2% by weight of aluminum hydroxide based on the total weight of the melamine, dicyandiamide, formaldehyde, ammonium phosphate, and aluminum hydroxide used to prepare the intumescent composition.

5. The flame retardant composition of claim 1, wherein the ceramic forming mixture comprises 5-10% by weight of CaO, 10-15% by weight of $Na_2CO_3$, and 5-10% by weight of $Al(OH)_3$ based on the total weight of the rubber, the intumescent composition, the ceramic forming mixture, the at least one glass additive, the layered silicate nanoparticles, and optionally the antioxidant in the flame retardant composition; or the ceramic forming mixture comprises 5-15% by weight of $Na_2CO_3$, 3-7% by weight of $Al(OH)_3$, and 3-7% by weight of silica based on the total weight of the rubber, the intumescent composition, the ceramic forming mixture, the at least one glass additive, the layered silicate nanoparticles, and optionally the antioxidant in the flame retardant composition.

6. The flame retardant composition of claim 1, wherein the layered silicate nanoparticles comprises at least one material selected from the group consisting of mica, montmorillonite and wollastonite.

7. The flame retardant composition of claim 1, wherein the flame retardant composition comprises: 30-50% by weight of a rubber selected from the group consisting of silicone, ethylene vinyl acetate, and a thermoplastic polyurethane, wherein the rubber is crosslinked with 1-2% by weight of triallyl isocyanurate; 5-10% by weight of an intumescent composition, wherein the intumescent composition comprises 10-20% by weight of ammonium phosphate and a melamine polymer prepared by combining 10-20% by weight of melamine, 15-20% by weight of dicyandiamide, 45-55% by weight of formaldehyde, and 1-2% by weight of aluminum hydroxide based on the total weight of the melamine, dicyandiamide, formaldehyde, and aluminum hydroxide used to prepare the intumescent composition; 11-35% by weight of a ceramic forming mixture comprising 5-10% by weight of CaO, 10-15% by weight of $Na_2CO_3$, and 5-10% by weight of $Al(OH)_3$; or the ceramic forming mixture comprises 5-15% by weight of $Na_2CO_3$, 3-7% by weight of $Al(OH)_3$, and 3-7% by weight of silica; 2-10% by weight of glass frit; and 15-35% by weight of a layered silicate nanoparticles selected from the group consisting of montmorillonite and wollastonite, wherein the weight percentages of the rubber, triallyl isocyanurate, the intumescent composition, the ceramic forming mixture, glass fit, and the layered silicate nanoparticles are based on the total weight of the rubber, triallyl isocyanurate, the intumescent composition, the ceramic forming mixture, glass frit, and the layered silicate nanoparticles in the flame retardant composition.

8. The flame retardant composition of claim 7, further comprising 1-2% by weight of a phenolic antioxidant based on the total weight of the rubber, triallyl isocyanurate, the intumescent composition, the ceramic forming mixture, glass frit, the layered silicate nanoparticles, and the phenolic antioxidant in the flame retardant composition.

9. The flame retardant composition of claim 8, wherein the phenolic antioxidant is pentaerythritol tetrakis(3-(3,5-di-tert-butyl-4-hydroxyphenyl)propionate).

10. The flame retardant composition of claim 7, wherein the flame retardant composition is halogen-free; has a tensile strength between 7-8.5 MPa; an elongation at break between 230-310%; and the gas that is generated when the flame retardant composition is burned has a pH between 6.4-6.6.

11. A method of preparing the flame retardant composition of claim 1, the method of comprising:
providing an intumescent composition comprising a phosphate and a melamine polymer formed by combining melamine formaldehyde, dicyandiamide, and aluminum hydroxide;
combining 5-10% by weight of the intumescent composition with 30-50% by weight of a rubber, 10-50% by weight of a ceramic forming mixture comprising CaO, $Na_2CO_3$, and $Al(OH)_3$; or the ceramic forming mixture comprises $Na_2CO_3$, $Al(OH)_3$, and silica; 2-10% by weight of at least one glass additive selected from glass fit, glass fiber, and glass powder; and 15-35% by weight of layered silicate nanoparticles; and optionally 0.5-3% by weight of a crosslinking agent and 0.1-5% by weight of a radical initiator thereby forming a flame retardant precursor composition, wherein the weight percentages of the intumescent composition, the rubber, the ceramic forming mixture, the at least one glass additive, the layered silicate nanoparticles, optionally crosslinking agent, and optionally the radical initiator are based on the total weight of the intumescent composition, rubber, the ceramic forming mixture, the at least one glass additive, the layered silicate nanoparticles, optionally crosslinking agent, and optionally the radical initiator in the flame retardant precursor composition; and
curing the flame retardant precursor composition thereby forming the flame retardant composition.

12. The method of claim 11, wherein rubber is selected from the group consisting of silicone, ethylene vinyl acetate, a thermoplastic polyurethane, natural rubber, isoprene rubber, styrene-butadiene copolymer rubber, polybutadiene rubber, ethylene-propylene-conjugated diene terpolymer rubber, butyl rubber, halogenated butyl rubber, fluorine rubber, epichlorohydrin rubber, acrylonitrile-butadiene rubber, and a terpolymer of ethylene, propylene and a diene elastomer.

13. The method of claim 11, wherein the crosslinking agent is selected from the group consisting of a trialkenyl isocyanurate, an alkenyl alkoxy silane, and an aminoalkyl alkoxy silane; and the radical initiator is present at 0.5-3% by weight and the radical initiator is an organic peroxide.

14. The method of claim 11, wherein the intumescent composition is prepared by combining 10-20% by weight of melamine, 15-20% by weight of dicyandiamide, 45-55% by weight of formaldehyde, 10-20% by weight of ammonium phosphate, and 1-2% by weight of aluminum hydroxide in the presence of water at a temperature between 40-100° C. thereby forming the intumescent composition.

15. The method of claim 13, wherein the ceramic forming mixture comprises 5-10% by weight CaO, 10-15% by weight $Na_2CO_3$, and 5-10% by weight of $Al(OH)_3$ relative to the weight of the flame retardant composition; or ceramic forming mixture comprises 5-15% by weight of $Na_2CO_3$, 3-7% by weight of $Al(OH)_3$, and 3-7% by weight of silica relative to the weight of the flame retardant precursor composition.

16. The method of claim 11, wherein the layered silicate nanoparticles comprise at least one material selected from the group consisting of mica, montmorillonite and wollastonite.

17. The method of claim 11, wherein the method comprises:
providing an intumescent composition comprising 15-20% by weight of ammonium phosphate and a melamine polymer prepared by combining 13-17% by weight of melamine, 15-20% by weight of dicyandiamide, 47-53% by weight of formaldehyde, and 1-1.5% by weight of aluminum hydroxide in the presence of water at a temperature between 40-100° C.;
combining 5-10% by weight of the intumescent composition with 30-50% by weight of a rubber selected from the group consisting of silicone, ethylene vinyl acetate, and a thermoplastic polyurethane, 11-35% by weight of a ceramic forming mixture comprising 5-10% by weight of CaO, 10-15% by weight of $Na_2CO_3$, and 5-10% by weight of $Al(OH)_3$; or the ceramic forming mixture comprises 5-15% by weight of $Na_2CO_3$, 3-7% by weight of $Al(OH)_3$, and 3-7% by weight of silica; 2-10% by weight of glass fit; and 15-35% by weight of layered silicate nanoparticles selected from the group consisting of montmorillonite and wollastonite; and optionally 1-2% by weight of triallyl isocyanurate; 0.3-5% by weight of di(tert-butylperoxyisopropyl)benzene; and 1-2% by weight of pentaerythritol tetrakis (3-(3,5-di-tert-butyl-4-hydroxyphenyl)propionate)
thereby forming a flame retardant precursor composition, wherein the weight percentages of the intumescent composition, the rubber, the ceramic forming mixture, the glass frit, the layered silicate nanoparticles, optionally the triallyl isocyanurate, the di(tert-butylperoxyisopropyl)benzene, and the pentaerythritol tetrakis(3-(3,5-di-tert-butyl-4-hydroxyphenyl)propionate) are based on the total weight of the intumescent composition, the rubber, the ceramic forming mixture, the glass frit, the layered silicate nanoparticles, optionally the triallyl isocyanurate, the di(tert-butylperoxyisopropyl) benzene, and the pentaerythritol tetrakis(3-(3,5-di-tert-butyl-4-hydroxyphenyl)propionate) in the flame retardant precursor composition; and
curing the flame retardant precursor composition at a temperature of 100-200° C. thereby forming the flame retardant composition.

18. The method of claim 17, wherein the step of curing the flame retardant precursor composition is conducted in a mold.

* * * * *